United States Patent
Akkarakaran et al.

(10) Patent No.: US 10,524,233 B2
(45) Date of Patent: Dec. 31, 2019

(54) TECHNIQUES AND APPARATUSES FOR TRANSMIT DIVERSITY WHILE MAINTAINING LOW PEAK TO AVERAGE POWER RATIO

(71) Applicant: QUALCOMM Incorporated, San Diego, CA (US)

(72) Inventors: Sony Akkarakaran, Poway, CA (US); Seyong Park, San Diego, CA (US); Tao Luo, San Diego, CA (US); Wei Zeng, San Diego, CA (US); Hao Xu, Beijing (CN); Peter Gaal, San Diego, CA (US); Yi Huang, San Diego, CA (US); Renqiu Wang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 93 days.

(21) Appl. No.: 15/693,197

(22) Filed: Aug. 31, 2017

(65) Prior Publication Data
US 2018/0213510 A1   Jul. 26, 2018

Related U.S. Application Data

(60) Provisional application No. 62/451,462, filed on Jan. 27, 2017, provisional application No. 62/451,007, filed on Jan. 26, 2017.

(51) Int. Cl.
*H04W 72/04* (2009.01)
*H04L 5/00* (2006.01)
(Continued)

(52) U.S. Cl.
CPC .......... *H04W 72/04* (2013.01); *H04B 7/0669* (2013.01); *H04B 7/0697* (2013.01);
(Continued)

(58) Field of Classification Search
None
See application file for complete search history.

(56) References Cited

U.S. PATENT DOCUMENTS 8,284,864 B2  10/2012  Mege
8,526,514 B2   9/2013  Kim et al.
(Continued)

FOREIGN PATENT DOCUMENTS

WO   2012051319 A1   4/2012

OTHER PUBLICATIONS

Luo, Xiliang et al., "Transmit Diversity Scheme over Single SC-FDM Symbol for LTE-Advanced", 2009.*
(Continued)

*Primary Examiner* — Phirin Sam
*Assistant Examiner* — Faiyazkhan Ghafoerkhan
(74) *Attorney, Agent, or Firm* — Steven R. Thiel; Harrity & Harrity LLP

(57) ABSTRACT

Some techniques and apparatuses described herein may assign resource elements of a particular resource block for transmission by two or more different antennas in a fashion such that the symbols are interleaved in frequency and/or in time, which improves frequency diversity of the two or more different antennas, thereby improving uplink performance of the UE. In some aspects, when the two or more resource blocks are contiguous, then each antenna may produce an interleaved frequency division multiple access (IFDMA) waveform, which may maintain peak to average power ratio (PAPR) properties of a single channel FDMA transmission. Thus, some techniques and apparatuses described herein may achieve transmit diversity and/or frequency diversity of a stream of symbols on two or more antennas without significantly increasing the PAPR of the stream of symbols.

30 Claims, 9 Drawing Sheets

(51) Int. Cl.
*H04B 7/06* (2006.01)
*H04L 27/26* (2006.01)
*H04B 7/26* (2006.01)

(52) U.S. Cl.
CPC ............. *H04B 7/26* (2013.01); *H04L 5/0005* (2013.01); *H04L 5/0048* (2013.01); *H04L 27/2614* (2013.01); *H04L 27/2636* (2013.01); *H04L 5/0037* (2013.01)

(56) References Cited

U.S. PATENT DOCUMENTS

| | | | |
|---|---|---|---|
| 8,532,047 B2 | 9/2013 | Nguyen et al. | |
| 8,699,609 B2 | 4/2014 | Sorrentino | |
| 9,379,858 B2 | 6/2016 | Erceg et al. | |
| 9,407,409 B2 | 8/2016 | Bhattad et al. | |
| 9,609,638 B2 | 3/2017 | Nakashima et al. | |
| 2002/0154715 A1* | 10/2002 | Jin | H04L 1/0618 375/347 |
| 2006/0227888 A1 | 10/2006 | Khan | |
| 2007/0274421 A1* | 11/2007 | Jin | H04L 1/0618 375/347 |
| 2009/0161749 A1* | 6/2009 | Nangia | H04L 5/0007 375/233 |
| 2010/0074130 A1 | 3/2010 | Bertrand et al. | |
| 2010/0119018 A1* | 5/2010 | Jin | H04L 1/0618 375/343 |
| 2011/0070891 A1* | 3/2011 | Nishio | H04L 5/0048 455/450 |
| 2011/0149944 A1* | 6/2011 | Ko | H04L 5/0023 370/344 |
| 2012/0288041 A1* | 11/2012 | Jin | H04L 1/0618 375/343 |
| 2013/0107785 A1 | 5/2013 | Bhattad et al. | |
| 2015/0071153 A1* | 3/2015 | Hong | H04L 5/0023 370/311 |
| 2015/0092716 A1* | 4/2015 | Han | H04L 5/0053 370/329 |
| 2015/0365266 A1 | 12/2015 | Zhang et al. | |
| 2016/0087829 A1 | 3/2016 | Jia et al. | |
| 2017/0085308 A1* | 3/2017 | Sun | H04B 7/0669 |
| 2017/0288759 A1 | 10/2017 | Namgoong et al. | |
| 2018/0205586 A1 | 7/2018 | Park et al. | |
| 2018/0212810 A1 | 7/2018 | Park et al. | |

OTHER PUBLICATIONS

International Search Report and Written Opinion—PCT/US2018/012267—ISA/EPO—May 14, 2018.

Luo X., et al., "Transmit Diversity Scheme over Single SC-FDM Symbol for LTE-Advanced," Global Telecommunications Conference, 2009. GLOBECOM 2009. IEEE, Nov. 30-Dec. 4, 2009, 6 pages.

Nokia, et al., "Way Forward Waveform for Carrier Frequencies Beyond 40 GHz", 3GPP Draft; R1-1609599, Way Forward Waveform for Carrier Frequencies Beyond 40 GHZ, 3rd Generation Partnership Project (3GPP), Mobile Competence Centre; 650, Route Des Lucioles; F-06921 Sophia-Antipo, vol. RAN WG1, No. Lisbon, Portugal; Oct. 10, 2016-Oct. 15, 2016, Oct. 9, 2016 (Oct. 9, 2016), pp. 1-8, XP051149636, Retrieved from the Internet: URL: http://www.3gpp.org/ftp/Meetings_3GPP_SYNC/RAN1/Docs/.

Panasonic: "Mapping Position of Control Channel for Uplink SC-FDMA", Internet Citation, R1-051395, Nov. 11, 2005 (Nov. 11, 2005), pp. 1-6, XP002450961, Retrieved from the Internet: URL: http://www.3gpp.org/ftp/tsg_ran/WG1_RL1/TSGR1_43/Docs/R1-051395.zip.

* cited by examiner

TECHNIQUES AND APPARATUSES FOR TRANSMIT DIVERSITY WHILE MAINTAINING LOW PEAK TO AVERAGE POWER RATIO

CROSS-REFERENCE TO RELATED APPLICATIONS UNDER 35 U.S.C. § 119

This application claims priority to U.S. Provisional Patent Application No. 62/451,462, filed Jan. 27, 2017, entitled "TECHNIQUES AND APPARATUSES FOR TRANSMIT DIVERSITY WHILE MAINTAINING LOW PEAK TO AVERAGE POWER RATIO," and to U.S. Provisional Patent Application No. 62/451,007, filed Jan. 26, 2017, entitled "FREQUENCY AND TIME DOMAIN MULTIPLEXING FOR LOW PEAK-TO-AVERAGE POWER RATIO (PAPR) WAVEFORM DESIGN WITH MULTIPLE STREAMS," which are hereby expressly incorporated by reference herein.

FIELD OF THE DISCLOSURE

Aspects of the present disclosure generally relate to wireless communication, and more particularly to techniques and apparatuses for transmit diversity while maintaining low peak to average power ratio.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, etc.). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless communication network may include a number of base stations (BSs) that can support communication for a number of user equipment (UEs). A UE may communicate with a BS via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a new radio (NR) BS, a 5G Node B, and/or the like.

The above multiple access technologies have been adopted in various telecommunication standards to provide a common protocol that enables different wireless communication devices to communicate on a municipal, national, regional, and even global level. New radio (NR), which may also be referred to as 5G, is a set of enhancements to the LTE mobile standard promulgated by the Third Generation Partnership Project (3GPP). NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or single carrier frequency division multiplexing (SC-FDM) (e.g., also known as discrete Fourier transform spread OFDM (DFT-s-OFDM)) on the uplink (UL), as well as supporting beamforming, multiple-input multiple-output (MIMO) antenna technology, and carrier aggregation. However, as the demand for mobile broadband access continues to increase, there exists a need for further improvements in LTE and NR technologies. Preferably, these improvements should be applicable to other multiple access technologies and the telecommunication standards that employ these technologies.

A wireless communication device, such as a UE, may transmit information to a recipient, such as another UE, a base station, and/or the like. In some cases, the UE may transmit the information on multiple, different antennas, using an approach such as transmit diversity (e.g., Spatial Orthogonal Resource Transmit Diversity (SORTD), etc.), multiple-input multiple-output (MIMO), and/or the like. In some aspects, when configuring transmit diversity, the UE may assign one or more respective resource blocks for each transmit antenna to transmit the signals. For example, each resource element of a first resource block may be assigned to a first antenna (e.g., for symbols to be transmitted by the first antenna), and each resource element of a second resource block may be assigned to a second antenna (e.g., for symbols to be transmitted by the second antenna). However, in such a case, there may be limited frequency diversity of the signals, since each antenna is assigned a respective set of contiguous resource elements. This may lead to degraded performance and increased interference.

SUMMARY

Some techniques and apparatuses described herein may assign resource elements of a particular resource block for transmission by two or more different antennas, which improves frequency diversity of the two or more different antennas, thereby improving uplink performance of the UE. For example, resource elements of two or more resource blocks may be alternatively assigned for a set of symbols to be transmitted by the first antenna and for the set of symbols to be transmitted by the second antenna in a fashion such that the symbols are interleaved in frequency and/or in time. In this way, frequency diversity of the transmission of the set of symbols is improved.

In some aspects, when the two or more resource blocks are contiguous, then each antenna may produce an interleaved frequency division multiple access (IFDMA) waveform, which may maintain peak to average power ratio (PAPR) properties of a single channel FDMA transmission. In some aspects, methods and apparatuses described herein may generate transmissions on the two or more antennas according to a process for frequency and time domain multiplexing of low PAPR waveforms with multiple streams, as described in more detail in the attached appendix. Thus, methods and apparatuses described herein may achieve transmit diversity and/or frequency diversity of a stream of symbols on two or more antennas without significantly increasing the PAPR of the stream of symbols.

In some aspects, a method for wireless communication may include generating, by a wireless communication device having a first antenna and a second antenna, a first signal and a second signal from a set of symbols, wherein the first signal includes a first portion of the set of symbols interleaved with null values, and wherein the second signal includes a second portion of the set of symbols interleaved with null values; assigning, by the wireless communication device, a first resource block and a second resource block for transmission of the first signal and the second signal, wherein the first antenna is assigned to transmit the first signal and the second signal during first time intervals of the first resource block and the second resource block, wherein the second antenna is assigned to transmit a modified version of the first signal and the second signal during second time intervals of the first resource block and the second resource block, wherein the first time intervals and the second time intervals are different time intervals; and transmitting, by the wireless communication device, the first signal and the second signal on the first time intervals using the first antenna and the modified version of the first signal and the second signal on the second time intervals using the second antenna, wherein the first signal and the second signal are interleaved with each other, and wherein the modified version of the first signal and the second signal is generated based at least in part on Alamouti encoding of the set of symbols.

In some aspects, a wireless communication device may include a memory and one or more processors coupled to the memory, the memory and the one or more processors may be configured to generate a first signal and a second signal from a set of symbols, wherein the first signal includes a first portion of the set of symbols interleaved with null values, and wherein the second signal includes a second portion of the set of symbols interleaved with null values; assigning, by the wireless communication device, a first resource block and a second resource block for transmission of the first signal and the second signal, wherein the first antenna is assigned to transmit the first signal and the second signal during first time intervals of the first resource block and the second resource block, wherein the second antenna is assigned to transmit a modified version of the first signal and the second signal during second time intervals of the first resource block and the second resource block, wherein the first time intervals and the second time intervals are different time intervals; and transmitting, by the wireless communication device, the first signal and the second signal on the first time intervals using the first antenna and the modified version of the first signal and the second signal on the second time intervals using the second antenna, wherein the first signal and the second signal are interleaved with each other, and wherein the modified version of the first signal and the second signal is generated based at least in part on Alamouti encoding of the set of symbols.

In some aspects, a non-transitory computer-readable medium may store one or more instructions for wireless communication. The one or more instructions, when executed by one or more processors of a wireless communication device, may cause the one or more processors to generate a first signal and a second signal from a set of symbols, wherein the first signal includes a first portion of the set of symbols interleaved with null values, and wherein the second signal includes a second portion of the set of symbols interleaved with null values; assign a first resource block and a second resource block for transmission of the first signal and the second signal, wherein a first antenna of the wireless communication device is assigned to transmit the first signal and the second signal during first time intervals of the first resource block and the second resource block, wherein a second antenna of the wireless communication device is assigned to transmit a modified version of the first signal and the second signal during second time intervals of the first resource block and the second resource block, wherein the first time intervals and the second time intervals are different time intervals; and transmit the first signal and the second signal on the first time intervals using the first antenna and the modified version of the first signal and the second signal on the second time intervals using the second antenna, wherein the first signal and the second signal are interleaved with each other, and wherein the modified version of the first signal and the second signal is generated based at least in part on Alamouti encoding of the set of symbols.

In some aspects, an apparatus for wireless communication may include means for generating, by a wireless communication device having a first antenna and a second antenna, a first signal and a second signal from a set of symbols, wherein the first signal includes a first portion of the set of symbols interleaved with null values, and wherein the second signal includes a second portion of the set of symbols interleaved with null values; means for assigning, by the wireless communication device, a first resource block and a second resource block for transmission of the first signal and the second signal, wherein the first antenna is assigned to transmit the first signal and the second signal during first time intervals of the first resource block and the second resource block, wherein the second antenna is assigned to transmit a modified version of the first signal and the second signal during second time intervals of the first resource block and the second resource block, wherein the first time intervals and the second time intervals are different time intervals; and means for transmitting, by the wireless communication device, the first signal and the second signal on the first time intervals using the first antenna and the modified version of the first signal and the second signal on the second time intervals using the second antenna, wherein the first signal and the second signal are interleaved with each other, and wherein the modified version of the first signal and the second signal is generated based at least in part on Alamouti encoding of the set of symbols.

In some aspects, a method for wireless communication may include assigning, by a wireless communication device having a first antenna and a second antenna, a first resource block and a second resource block for transmission of a set of symbols, wherein the first antenna is assigned to transmit a first portion of the set of symbols during first time intervals of the first resource block and the second resource block, wherein the second antenna is assigned to transmit a second portion of the set of symbols during second time intervals of the first resource block and the second resource block, and wherein the first time intervals and the second time intervals are different time intervals. The method may include transmitting, by the wireless communication device, the first portion of the set of symbols on the first time intervals using the first antenna and the second portion of the set of symbols on the second time intervals using the second antenna.

In some aspects, a wireless communication device for wireless communication may include one or more processors configured to assign a first resource block and a second resource block for transmission of a set of symbols, wherein the device has a first antenna and a second antenna, wherein the first antenna is assigned to transmit a first portion of the set of symbols during first time intervals of the first resource block and the second resource block, wherein the second antenna is assigned to transmit a second portion of the set of symbols during second time intervals of the first resource block and the second resource block, and wherein the first time intervals and the second time intervals are different time intervals. The one or more processors may be configured to transmit the first portion of the set of symbols on the first time intervals using the first antenna and the second portion of the set of symbols on the second time intervals using the second antenna.

In some aspects, a non-transitory computer-readable medium may store one or more instructions for wireless communication. The one or more instructions, when executed by one or more processors of a wireless communication device, may cause the one or more processors to assign a first resource block and a second resource block for transmission of a set of symbols, wherein the device has a first antenna and a second antenna, wherein the first antenna is assigned to transmit a first portion of the set of symbols during first time intervals of the first resource block and the second resource block, wherein the second antenna is assigned to transmit a second portion of the set of symbols during second time intervals of the first resource block and the second resource block, and wherein the first time intervals and the second time intervals are different time intervals. The one or more instructions, when executed by one or more processors of the wireless communication device, may cause the one or more processors to transmit the first portion of the set of symbols on the first time intervals using the first antenna and the second portion of the set of symbols on the second time intervals using the second antenna.

In some aspects, an apparatus for wireless communication may include means for assigning a first resource block and a second resource block for transmission of a set of symbols, wherein the apparatus has a first antenna and a second antenna, wherein the first antenna is assigned to transmit a first portion of the set of symbols during first time intervals of the first resource block and the second resource block, wherein the second antenna is assigned to transmit a second portion of the set of symbols during second time intervals of the first resource block and the second resource block, and wherein the first time intervals and the second time intervals are different time intervals. The apparatus may include means for transmitting the first portion of the set of symbols on the first time intervals using the first antenna and the second portion of the set of symbols on the second time intervals using the second antenna.

Aspects generally include a method, apparatus, system, computer program product, non-transitory computer-readable medium, user equipment, wireless communication device, and processing system as substantially described herein with reference to and as illustrated by the accompanying drawings.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purpose of illustration and description, and not as a definition of the limits of the claims.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Figure 1:
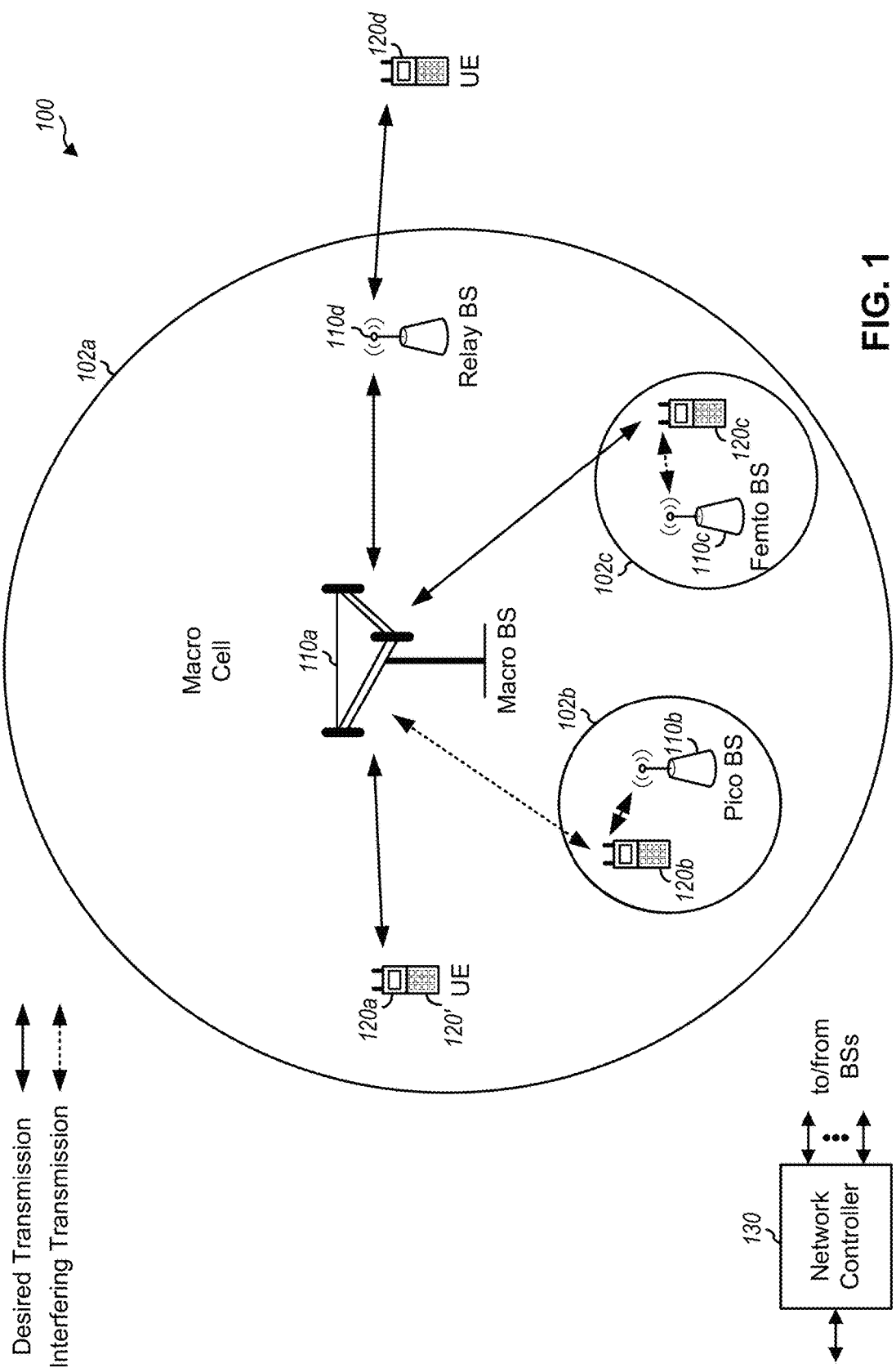
FIG. 1 is a block diagram conceptually illustrating an example of a wireless communication network, in accordance with certain aspects of the present disclosure.

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim. The word "exemplary" is used herein to mean "serving as an example, instance, or illustration." Any aspect described herein as "exemplary" is not necessarily to be construed as preferred or advantageous over another aspect. Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, etc. (collectively referred to as "elements"). These elements may be implemented using hardware, software, or combinations thereof. Whether such elements are implemented as hardware or software depends upon the particular application and design constraints imposed on the overall system.

An access point ("AP") may comprise, be implemented as, or known as NodeB, Radio Network Controller ("RNC"), eNodeB (eNB), Base Station Controller ("BSC"), Base Transceiver Station ("BTS"), Base Station ("BS"), Transceiver Function ("TF"), Radio Router, Radio Transceiver, Basic Service Set ("BSS"), Extended Service Set ("ESS"), Radio Base Station ("RBS"), Node B (NB), gNB, 5G NB, NR BS, Transmit Receive Point (TRP), or some other terminology.

An access terminal ("AT") may comprise, be implemented as, or be known as an access terminal, a subscriber station, a subscriber unit, a mobile station, a remote station, a remote terminal, a user terminal, a user agent, a user device, user equipment (UE), a user station, a wireless node, or some other terminology. In some aspects, an access terminal may comprise a cellular telephone, a smart phone, a cordless telephone, a Session Initiation Protocol ("SIP") phone, a wireless local loop ("WLL") station, a personal digital assistant ("PDA"), a tablet, a netbook, a smartbook, an ultrabook, a handheld device having wireless connection capability, a Station ("STA"), or some other suitable processing device connected to a wireless modem. Accordingly, one or more aspects taught herein may be incorporated into a phone (e.g., a cellular phone, a smart phone), a computer (e.g., a desktop), a portable communication device, a portable computing device (e.g., a laptop, a personal data assistant, a tablet, a netbook, a smartbook, an ultrabook), wearable device (e.g., smart watch, smart glasses, smart bracelet, smart wristband, smart ring, smart clothing, etc.), medical devices or equipment, biometric sensors/devices, an entertainment device (e.g., music device, video device, satellite radio, gaming device, etc.), a vehicular component or sensor, smart meters/sensors, industrial manufacturing equipment, a global positioning system device, or any other suitable device that is configured to communicate via a wireless or wired medium. In some aspects, the node is a wireless node. A wireless node may provide, for example, connectivity for or to a network (e.g., a wide area network such as the Internet or a cellular network) via a wired or wireless communication link. Some UEs may be considered machine-type communication (MTC) UEs, which may include remote devices that may communicate with a base station, another remote device, or some other entity. Machine type communications (MTC) may refer to communication involving at least one remote device on at least one end of the communication and may include forms of data communication which involve one or more entities that do not necessarily need human interaction. MTC UEs may include UEs that are capable of MTC communications with MTC servers and/or other MTC devices through Public Land Mobile Networks (PLMN), for example. Examples of MTC devices include sensors, meters, location tags, monitors, drones, robots/robotic devices, etc. MTC UEs, as well as other types of UEs, may be implemented as NB-IoT (narrowband internet of things) devices.

It is noted that while aspects may be described herein using terminology commonly associated with 3G and/or 4G wireless technologies, aspects of the present disclosure can be applied in other generation-based communication systems, such as 5G and later, including NR technologies.

FIG. 1 is a diagram illustrating a network 100 in which aspects of the present disclosure may be practiced. The network 100 may be an LTE network or some other wireless network, such as a 5G or NR network. Wireless network 100 may include a number of BSs 110 (shown as BS 110a, BS 110b, BS 110c, and BS 110d) and other network entities. A BS is an entity that communicates with user equipment (UEs) and may also be referred to as a base station, a NR BS, a Node B, a gNB, a 5G NB, an access point, a TRP, etc. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some examples, a cell may not necessarily be stationary, and the geographic area of the cell may move according to the location of a mobile BS. In some examples, the BSs may be interconnected to one another and/or to one or more other BSs or network nodes (not shown) in the access network 100 through various types of backhaul interfaces such as a direct physical connection, a virtual network, and/or the like using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay station 110d may communicate with macro BS 110a and a UE 120d in order to facilitate communication between BS 110a and UE 120d. A relay station may also be referred to as a relay BS, a relay base station, a relay, etc.

Wireless network 100 may be a heterogeneous network that includes BSs of different types, e.g., macro BSs, pico BSs, femto BSs, relay BSs, etc. These different types of BSs may have different transmit power levels, different coverage areas, and different impact on interference in wireless network 100. For example, macro BSs may have a high transmit power level (e.g., 5 to 40 Watts) whereas pico BSs, femto BSs, and relay BSs may have lower transmit power levels (e.g., 0.1 to 2 Watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, etc. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium. Some UEs may be considered evolved or enhanced machine-type communication (eMTC) UEs. MTC and eMTC UEs include, for example, robots, drones, remote devices, such as sensors, meters, monitors, location tags, etc., that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices. Some UEs may be considered a Customer Premises Equipment (CPE). UE 120 may be included inside a housing that houses components of UE 120, such as processor components, memory components, and/or the like.

In FIG. 1, a solid line with double arrows indicates desired transmissions between a UE and a serving BS, which is a BS designated to serve the UE on the downlink and/or uplink. A dashed line with double arrows indicates potentially interfering transmissions between a UE and a BS.

In general, any number of wireless networks may be deployed in a given geographic area. Each wireless network may support a particular RAT and may operate on one or more frequencies. A RAT may also be referred to as a radio technology, an air interface, etc. A frequency may also be referred to as a carrier, a frequency channel, etc. Each frequency may support a single RAT in a given geographic area in order to avoid interference between wireless networks of different RATs. In some cases, NR or 5G RAT networks may be deployed, which may sometimes use advanced radio technology, such as single-carrier waveforms and/or the like.

In some examples, access to the air interface may be scheduled, wherein a scheduling entity (e.g., a base station) allocates resources for communication among some or all devices and equipment within the scheduling entity's service area or cell. Within the present disclosure, as discussed further below, the scheduling entity may be responsible for scheduling, assigning, reconfiguring, and releasing resources for one or more subordinate entities. That is, for scheduled communication, subordinate entities utilize resources allocated by the scheduling entity.

Base stations are not the only entities that may function as a scheduling entity. That is, in some examples, a UE may function as a scheduling entity, scheduling resources for one or more subordinate entities (e.g., one or more other UEs). In this example, the UE is functioning as a scheduling entity, and other UEs utilize resources scheduled by the UE for wireless communication. A UE may function as a scheduling entity in a peer-to-peer (P2P) network, and/or in a mesh network. In a mesh network example, UEs may optionally communicate directly with one another in addition to communicating with the scheduling entity.

Thus, in a wireless communication network with a scheduled access to time—frequency resources and having a cellular configuration, a P2P configuration, and a mesh configuration, a scheduling entity and one or more subordinate entities may communicate utilizing the scheduled resources.

As indicated above, FIG. 1 is provided merely as an example. Other examples are possible and may differ from what was described with regard to FIG. 1.

Figure 2:
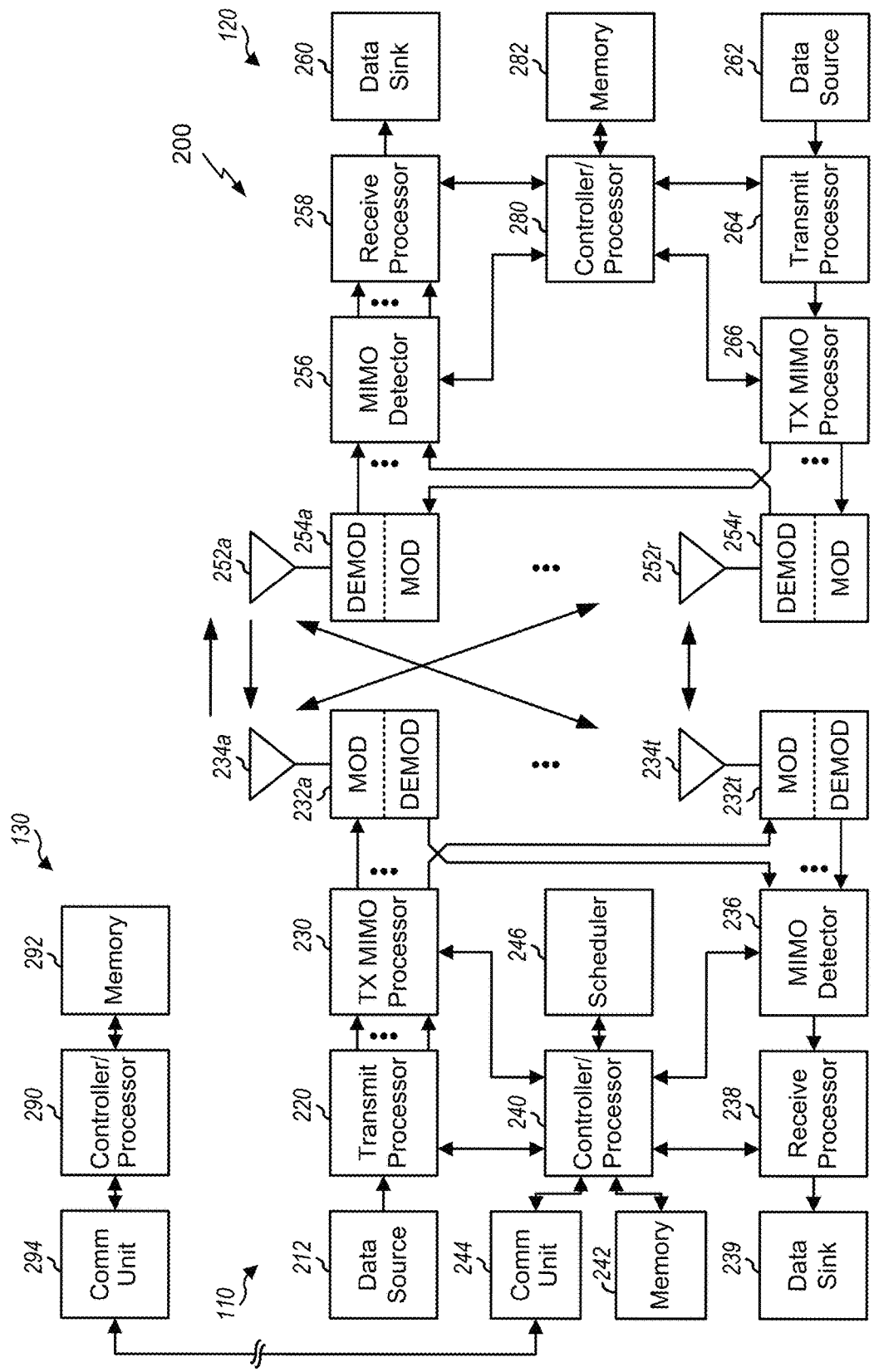
FIG. 2 shows a block diagram conceptually illustrating an example of a base station in communication with a user equipment (UE) in a wireless communication network, in accordance with certain aspects of the present disclosure.

FIG. 2 shows a block diagram of a design of base station 110 and UE 120, which may be one of the base stations and one of the UEs in FIG. 1. Base station 110 may be equipped with T antennas 234a through 234t, and UE 120 may be equipped with R antennas 252a through 252r, where in general $T \geq 1$ and $R \geq 1$.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI), etc.) and control information (e.g., CQI requests, grants, upper layer signaling, etc.) and provide overhead symbols and control symbols. Transmit processor 220 may also generate reference symbols for reference signals (e.g., the cell-specific reference signal (CRS)) and synchronization signals (e.g., the primary synchronization signal (PSS) and secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM, etc.) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively. According to certain aspects described in more detail below, the synchronization signals can be generated with location encoding to convey additional information.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM, etc.) to obtain received symbols. A MIMO detector 256 may obtain received symbols from all R demodulators 254a through 254r, perform MIMO detection on the received symbols if applicable, and provide detected symbols. A receive (RX) processor 258 may process (e.g., demodulate and decode) the detected symbols, provide decoded data for UE 120 to a data sink 260, and provide decoded control information and system information to a controller/processor 280. A channel processor may determine reference signal received power (RSRP), received signal strength indicator (RSSI), reference signal received quality (RSRQ), channel quality indicator (CQI), etc.

On the uplink, at UE 120, a transmit (TX) processor 264 may receive and process data from a data source 262 and control information (e.g., for reports comprising RSRP, RSSI, RSRQ, CQI, etc.) from controller/processor 280. TX processor 264 may also generate reference symbols for one or more reference signals. The symbols from TX processor 264 may be precoded by a TX MIMO processor 266 if applicable, further processed by modulators 254a through 254r (e.g., for Alamouti encoding, DFT-s-OFDM, CP-OFDM, etc.), and transmitted to base station 110. At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Network controller 130 may include communication unit 294, controller/processor 290, and memory 292.

In some aspects, one or more components of UE 120 may be included in a housing. Controllers/processors 240 and 280 and/or any other component(s) in FIG. 2 may direct the operation at base station 110 and UE 120, respectively, to perform transmission of a symbol stream with low PAPR transmit diversity. For example, controller/processor 280 and/or other processors and modules at UE 120, may perform or direct operations of UE 120 to perform transmission of a symbol stream with low PAPR transmit diversity. For example, controller/processor 280 and/or other controllers/processors and modules at UE 120 may perform or direct operations of, for example, example process 700 of FIG. 7, and/or other processes as described herein. In some aspects, one or more of the components shown in FIG. 2 may be employed to perform example process 700, and/or other processes for the techniques described herein. Memories 242 and 282 may store data and program codes for base station 110 and UE 120, respectively. A scheduler 246 may schedule UEs for data transmission on the downlink and/or uplink.

As indicated above, FIG. 2 is provided merely as an example. Other examples are possible and may differ from what was described with regard to FIG. 2.

Figure 3:
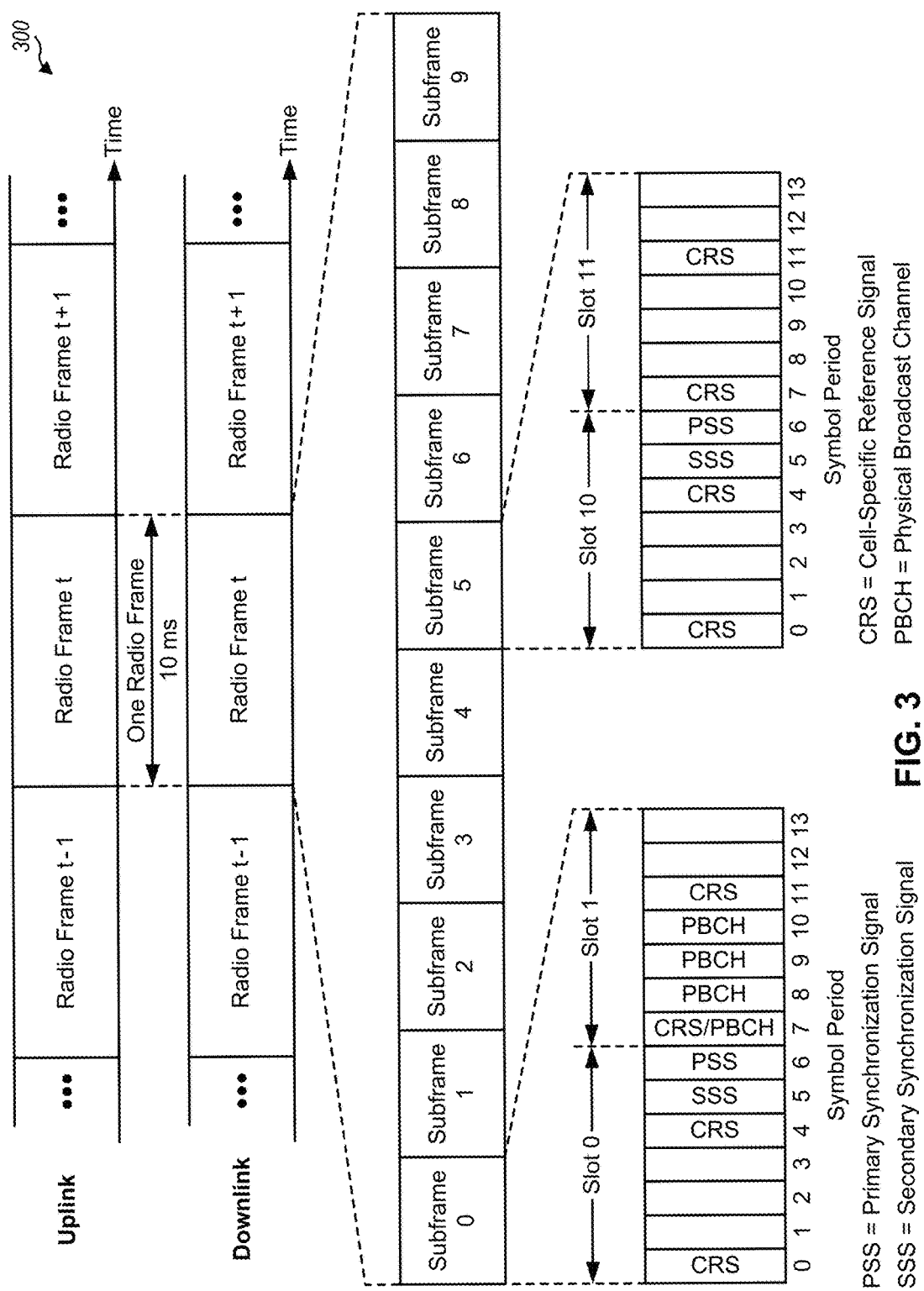
FIG. 3 is a block diagram conceptually illustrating an example of a frame structure in a wireless communication network, in accordance with certain aspects of the present disclosure.

FIG. 3 shows an example frame structure 300 for frequency division duplexing (FDD) in a telecommunications system (e.g., LTE). The transmission timeline for each of the downlink and uplink may be partitioned into units of radio frames. Each radio frame may have a predetermined duration (e.g., 10 milliseconds (ms)) and may be partitioned into 10 subframes with indices of 0 through 9. Each subframe may include two slots. Each radio frame may thus include 20 slots with indices of 0 through 19. Each slot may include L symbol periods, e.g., seven symbol periods for a normal cyclic prefix (as shown in FIG. 3) or six symbol periods for an extended cyclic prefix. The 2L symbol periods in each subframe may be assigned indices of 0 through 2L−1.

While some techniques are described herein in connection with frames, subframes, slots, and/or the like, these techniques may equally apply to other types of wireless communication structures, which may be referred to using terms other than "frame," "subframe," "slot," and/or the like in 5G NR. In some aspects, a wireless communication structure may refer to a periodic time-bounded communication unit defined by a wireless communication standard and/or protocol.

In certain telecommunications (e.g., LTE), a BS may transmit a primary synchronization signal (PSS) and a secondary synchronization signal (SSS) on the downlink in the center of the system bandwidth for each cell supported by the BS. The PSS and SSS may be transmitted in symbol periods 6 and 5, respectively, in subframes 0 and 5 of each radio frame with the normal cyclic prefix, as shown in FIG. 3. The PSS and SSS may be used by UEs for cell search and acquisition. The BS may transmit a cell-specific reference signal (CRS) across the system bandwidth for each cell supported by the BS. The CRS may be transmitted in certain symbol periods of each subframe and may be used by the UEs to perform channel estimation, channel quality measurement, and/or other functions. The BS may also transmit a physical broadcast channel (PBCH) in symbol periods 0 to 3 in slot 1 of certain radio frames. The PBCH may carry some system information. The BS may transmit other system information such as system information blocks (SIBs) on a physical downlink shared channel (PDSCH) in certain subframes. The BS may transmit control information/data on a physical downlink control channel (PDCCH) in the first B symbol periods of a subframe, where B may be configurable for each subframe. The BS may transmit traffic data and/or other data on the PDSCH in the remaining symbol periods of each subframe.

In other systems (e.g., such NR or 5G systems), a Node B may transmit these or other signals in these locations or in different locations of the subframe.

As indicated above, FIG. 3 is provided merely as an example. Other examples are possible and may differ from what was described with regard to FIG. 3.

Figure 4:
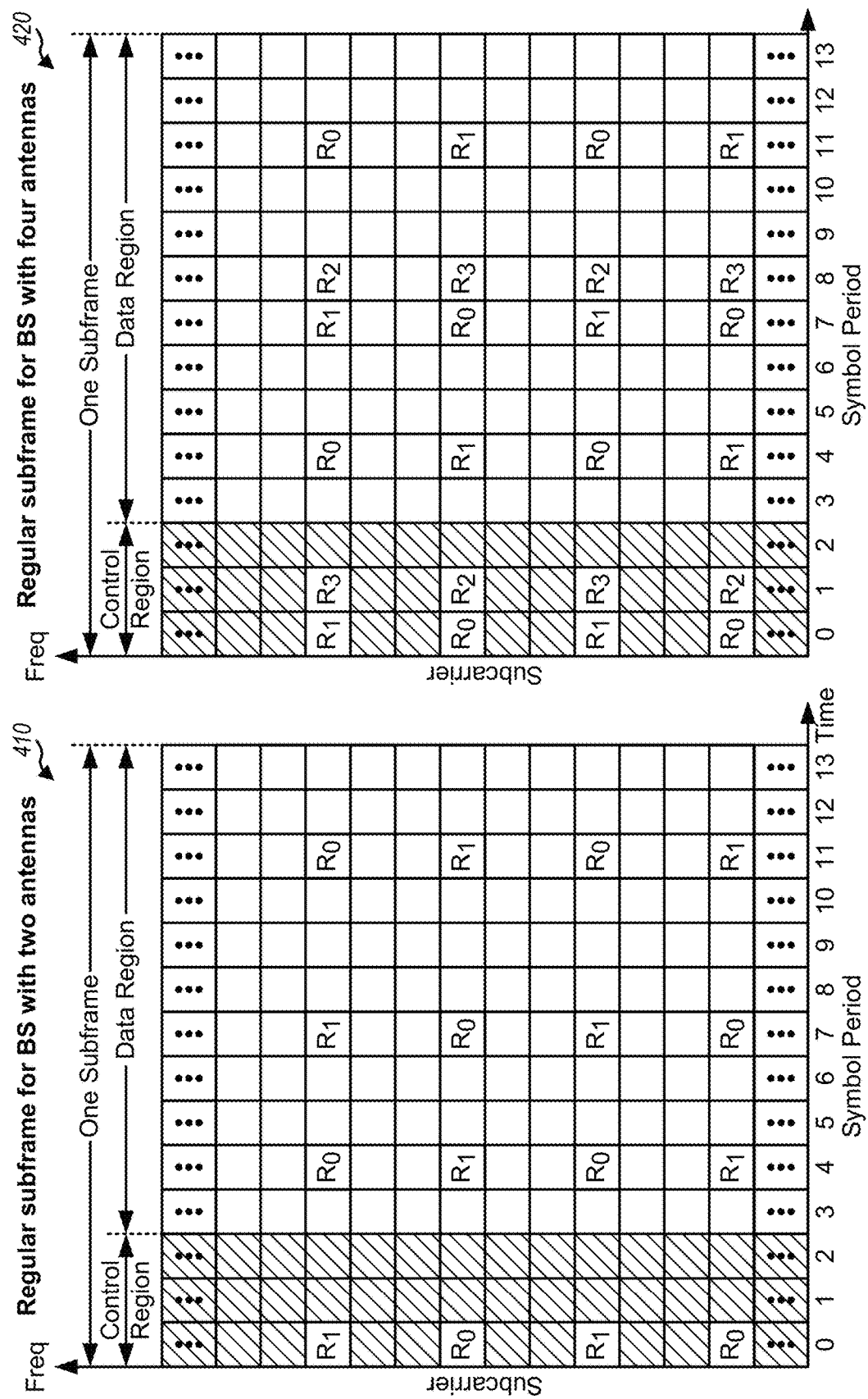
FIG. 4 is a block diagram conceptually illustrating two example subframe formats with the normal cyclic prefix, in accordance with certain aspects of the present disclosure.

FIG. 4 shows two example subframe formats 410 and 420 with the normal cyclic prefix. The available time frequency resources may be partitioned into resource blocks. Each resource block may cover 12 subcarriers in one slot and may include a number of resource elements. Each resource element may cover one subcarrier in one symbol period and may be used to send one modulation symbol, which may be a real or complex value.

Subframe format 410 may be used for two antennas. A CRS may be transmitted from antennas 0 and 1 in symbol periods 0, 4, 7 and 11. A reference signal is a signal that is known a priori by a transmitter and a receiver and may also be referred to as pilot. A CRS is a reference signal that is specific for a cell, e.g., generated based at least in part on a cell identity (ID). In FIG. 4, for a given resource element with label Ra, a modulation symbol may be transmitted on that resource element from antenna a, and no modulation symbols may be transmitted on that resource element from other antennas. Subframe format 420 may be used with four antennas. A CRS may be transmitted from antennas 0 and 1 in symbol periods 0, 4, 7 and 11 and from antennas 2 and 3 in symbol periods 1 and 8. For both subframe formats 410 and 420, a CRS may be transmitted on evenly spaced subcarriers, which may be determined based at least in part on cell ID. CRSs may be transmitted on the same or different subcarriers, depending on their cell IDs. For both subframe formats 410 and 420, resource elements not used for the CRS may be used to transmit data (e.g., traffic data, control data, and/or other data).

The PSS, SSS, CRS and PBCH in LTE are described in 3GPP TS 36.211, entitled "Evolved Universal Terrestrial Radio Access (E-UTRA); Physical Channels and Modulation," which is publicly available.

An interlace structure may be used for each of the downlink and uplink for FDD in certain telecommunications systems (e.g., LTE). For example, Q interlaces with indices of 0 through Q—1 may be defined, where Q may be equal to 4, 6, 8, 10, or some other value. Each interlace may include subframes that are spaced apart by Q frames. In particular, interlace q may include subframes q, q+Q, q+2Q, etc., where q∈{0, . . . , Q−1}.

The wireless network may support hybrid automatic retransmission request (HARQ) for data transmission on the downlink and uplink. For HARQ, a transmitter (e.g., a BS) may send one or more transmissions of a packet until the packet is decoded correctly by a receiver (e.g., a UE) or some other termination condition is encountered. For synchronous HARQ, all transmissions of the packet may be sent in subframes of a single interlace. For asynchronous HARQ, each transmission of the packet may be sent in any subframe.

A UE may be located within the coverage of multiple BSs. One of these BSs may be selected to serve the UE. The serving BS may be selected based at least in part on various criteria such as received signal strength, received signal quality, path loss, and/or the like. Received signal quality may be quantified by a signal-to-noise-and-interference ratio (SINR), or a reference signal received quality (RSRQ), or some other metric. The UE may operate in a dominant interference scenario in which the UE may observe high interference from one or more interfering BSs.

While aspects of the examples described herein may be associated with LTE technologies, aspects of the present disclosure may be applicable with other wireless communication systems, such as NR or 5G technologies.

New radio (NR) may refer to radios configured to operate according to a new air interface (e.g., other than Orthogonal Frequency Divisional Multiple Access (OFDMA)-based air interfaces) or fixed transport layer (e.g., other than Internet Protocol (IP)). In aspects, NR may utilize OFDM with a CP (herein referred to as cyclic prefix OFDM or CP-OFDM) and/or SC-FDM on the uplink, may utilize CP-OFDM on the downlink and include support for half-duplex operation using time division duplexing (TDD). In aspects, NR may, for example, utilize OFDM with a CP (herein referred to as CP-OFDM) and/or discrete Fourier transform spread orthogonal frequency-division multiplexing (DFT-s-OFDM) on the uplink, may utilize CP-OFDM on the downlink and include support for half-duplex operation using TDD. NR may include Enhanced Mobile Broadband (eMBB) service targeting wide bandwidth (e.g., 80 megahertz (MHz) and beyond), millimeter wave (mmW) targeting high carrier frequency (e.g., 60 gigahertz (GHz)), massive MTC (mMTC) targeting non-backward compatible MTC techniques, and/or mission critical targeting ultra reliable low latency communications (URLLC) service.

A single component carrier bandwidth of 100 MHZ may be supported. NR resource blocks may span 12 sub-carriers with a sub-carrier bandwidth of 75 kilohertz (kHz) over a 0.1 ms duration. Each radio frame may include 50 subframes with a length of 10 ms. Consequently, each subframe may have a length of 0.2 ms. Each subframe may indicate a link direction (e.g., DL or UL) for data transmission and the link direction for each subframe may be dynamically switched. Each subframe may include downlink/uplink (DL/UL) data as well as DL/UL control data.

Beamforming may be supported and beam direction may be dynamically configured. Additionally, or alternatively, single-carrier waveforms may be used, which may benefit from the maintenance of a low PAPR. MIMO transmissions with precoding may also be supported. MIMO configurations in the DL may support up to 8 transmit antennas with multi-layer DL transmissions up to 8 streams and up to 2 streams per UE. Multi-layer transmissions with up to 2 streams per UE may be supported. Aggregation of multiple cells may be supported with up to 8 serving cells. Alternatively, NR may support a different air interface, other than an OFDM-based interface. NR networks may include entities such central units or distributed units.

The RAN may include a central unit (CU) and distributed units (DUs). A NR BS (e.g., gNB, 5G Node B, Node B, transmit receive point (TRP), access point (AP)) may correspond to one or multiple BSs. NR cells can be configured as access cells (ACells) or data only cells (DCells). For example, the RAN (e.g., a central unit or distributed unit) can configure the cells. DCells may be cells used for carrier aggregation or dual connectivity, but not used for initial access, cell selection/reselection, or handover. In some cases, DCells may not transmit synchronization signals—in some case cases DCells may transmit SS. NR BSs may transmit downlink signals to UEs indicating the cell type. Based at least in part on the cell type indication, the UE may communicate with the NR BS. For example, the UE may determine NR BSs to consider for cell selection, access, handover, and/or measurement based at least in part on the indicated cell type.

As indicated above, FIG. 4 is provided merely as an example. Other examples are possible and may differ from what was described with regard to FIG. 4.

Figure 5:
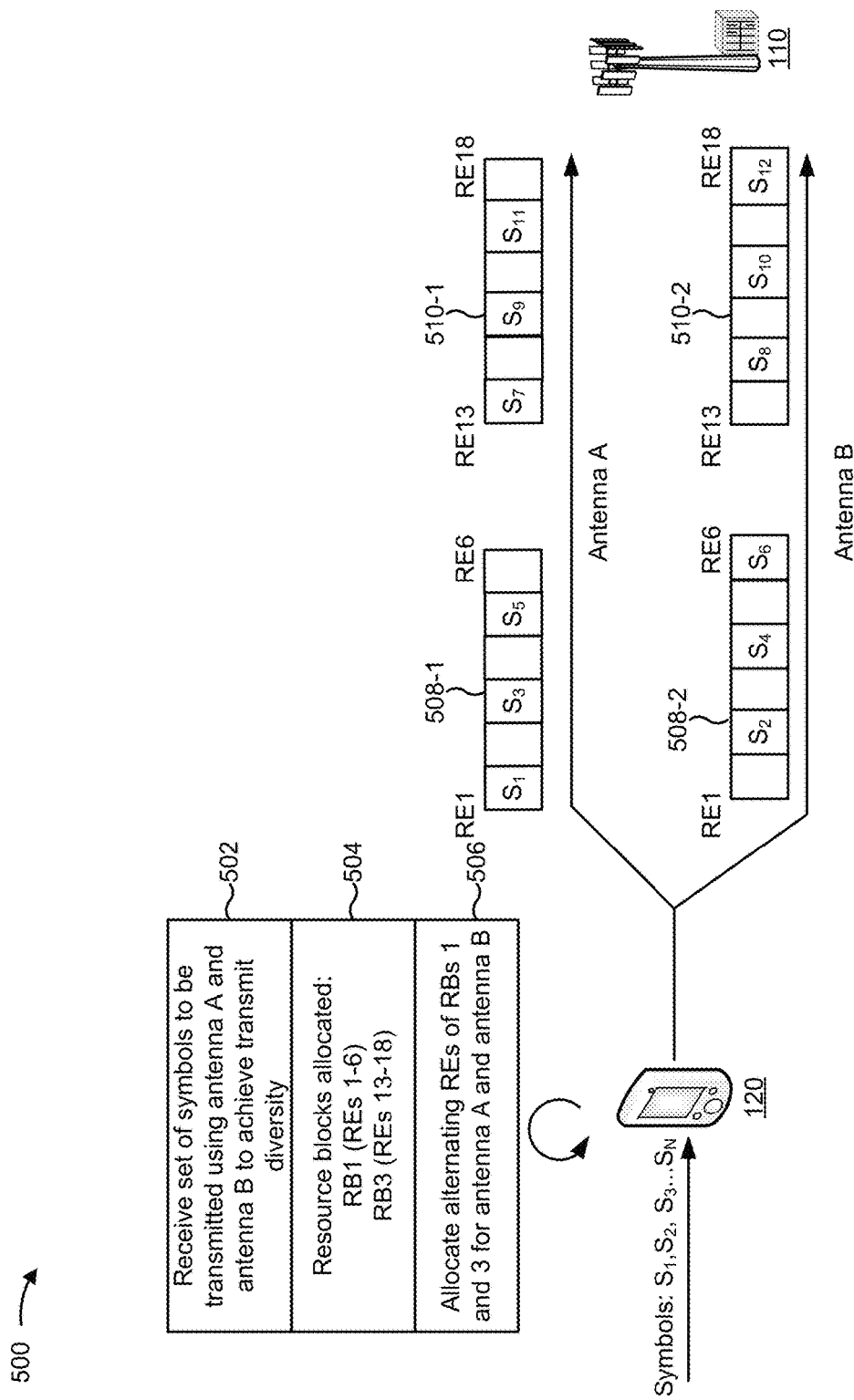
FIG. 5 is a diagram illustrating an example of achieving transmit diversity with frequency interleaving, in accordance with various aspects of the present disclosure.

FIG. 5 is a diagram illustrating an example 500 of achieving transmit diversity with frequency interleaving, in accordance with various aspects of the present disclosure.

As shown in FIG. 5, and by reference number 502, the UE 120 may receive a set of symbols to be transmitted. In some aspects, the UE 120 may receive a bit stream, and may perform modulation mapping to map the set of symbols to the bit stream. In some aspects, the set of symbols may include uplink control information, a reference signal (e.g., a demodulated reference signal and/or the like), and/or other information. As further shown, the UE 120 may determine that the set of symbols is to be transmitted using antenna A and antenna B (not shown) to achieve transmit diversity of the set of symbols. For example, the UE 120 may be associated with two or more transmit antennas including antennas A and B, and the UE 120 may determine that the set of symbols is to be transmitted on antennas A and B. This may improve uplink performance of the UE 120 and reduce a detrimental effect of interference with one of the transmissions of antennas A and B.

As shown by reference number 504, the UE 120 may allocate resource blocks RB1 and RB3 for transmission of the set of symbols. In some aspects, RB1 and RB3 may be contiguous (e.g., in frequency and/or time). In some aspects, RB1 and RB3 may not be contiguous. As further shown, RB1 is associated with resource elements (REs) 1 through 6, and RB3 is associated with REs 13 through 18.

In some aspects, such as when using a SORTD approach, a UE would assign one contiguous RB per antenna. For example, in the scenario shown, the UE 120 might allocate an entirety of RB 1 for antenna A and an entirety of RB 3 for antenna B. This may lead to poor uplink performance due to poor frequency diversity.

As shown by reference number 506, the UE 120 may allocate alternating REs of RB1 and RB 3 for antenna A and antenna B. For example, the UE 120 may aggregate RB1 and RB3, and may assign alternate REs to the alternate antennas. This may allow for increased frequency diversity from each antenna as compared to a situation where a respective contiguous RB is assigned to each antenna. In some aspects, the UE 120 may allocate the alternating REs for uplink control data (e.g., physical uplink control channel (PUCCH) data), a demodulation reference signal (DMRS), and/or the like.

As shown by reference number 508-1, symbols $S_1$, $S_3$, and $S_5$ may be allocated for transmission on RB1 by antenna A. As shown by reference number 508-2, symbols $S_2$, $S_4$, and $S_6$ may be allocated for transmission on RB1 by antenna B. In this way, transmit diversity is achieved with improved frequency diversity as compared to SORTD without frequency interleaving.

As shown by reference number 510-1, symbols $S_7$, $S_9$, and $S_{11}$ may be allocated for transmission on RB3 by antenna A. As shown by reference number 510-2, symbols $S_8$, $S_{10}$, and $S_{12}$ may be allocated for transmission on RB3 by antenna B. In this way, transmit diversity is achieved with improved frequency diversity as compared to SORTD without frequency interleaving. Furthermore, if one or more symbols of RB1 are interrupted, the BS 110 may obtain the one or more symbols from the transmission on RB3.

In some aspects, when RB1 and RB3 are contiguous (e.g., in frequency or time), then antenna A and antenna B may produce an interleaved FDMA waveform. The interleaved FDMA waveform may resemble a SC-FDM waveform, and a discrete Fourier transform (DFT) spreading output may be populated on equi-spaced tones (e.g., as compared to a SC-FDM waveform, on which the DFT spreading output may be populated on contiguous tones). This, in turn, may create time-domain periodic copies of the corresponding SC-FDM waveform, which in effect maintains the low PAPR characteristic of the corresponding SC-FDM waveform. For example, when alternating tones or subcarriers are used in the frequency domain, the resulting waveform may be compressed in the time domain, and may be repeated according to an upsampling rate of the resulting waveform while maintaining the low PAPR characteristic. Thus, transmit diversity may be achieved while maintaining low PAPR. As used herein, SC-FDM is used interchangeably with DFT-s-OFDM, and SC-FDM refers to DFT-s-OFDM.

As indicated above, FIG. 5 is provided as an example. Other examples are possible and may differ from what was described with respect to FIG. 5.

Figure 6:
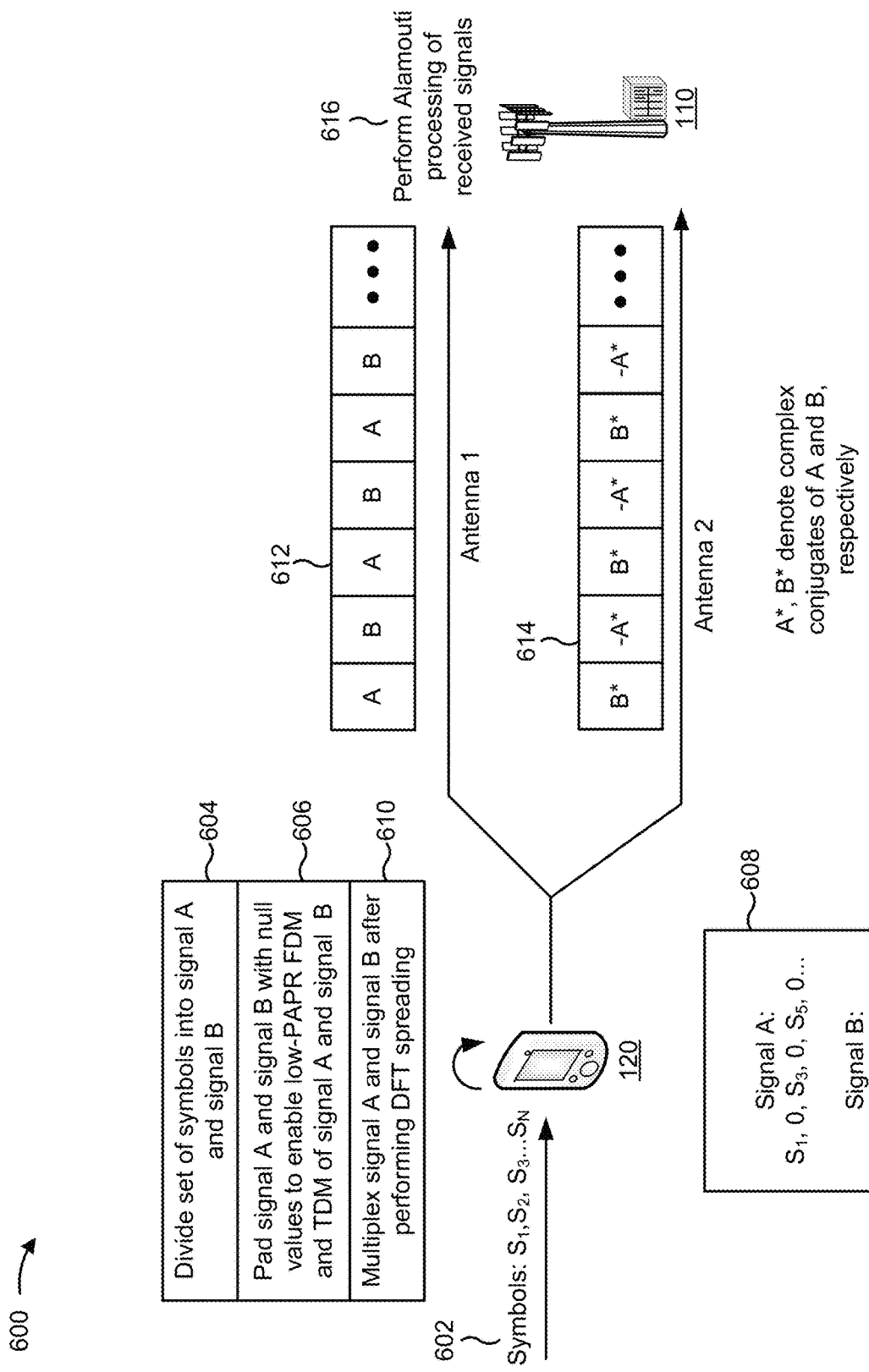
FIG. 6 is a diagram illustrating an example of achieving transmit diversity with time and frequency interleaving while preserving low PAPR, in accordance with various aspects of the present disclosure.

FIG. 6 is a diagram illustrating an example 600 of achieving transmit diversity with time and frequency interleaving while preserving low PAPR, in accordance with various aspects of the present disclosure. FIG. 6 shows a UE 120, which is associated with antennas 1 and 2 (not shown).

As shown by reference number 602, the UE 120 may receive a set of symbols (e.g., $S_1$, $S_2$, $S_3$, and so on), as described in more detail in connection with reference number 502 of FIG. 5, above.

As shown by reference number 604, the UE 120 may divide the set of symbols into signal A and signal B. The UE 120 may divide the set of symbols into two signals so that the set of symbols can be transmitted on two antennas with time and frequency interleaving while preserving a low-PAPR characteristic of a single-carrier transmission. As shown by reference number 606, to preserve the low-PAPR characteristic of the single-carrier transmission, the UE 120 may pad signal A and signal B with null values (e.g., zero and/or the like) to enable FDM and time division multiplexing (TDM) of signal A and signal B. As shown by reference number 608, signal A may include symbols $S_1$, $S_3$, $S_5$, and so on, separated by single null values. As further shown, signal B may include symbols $S_2$, $S_4$, $S_6$, and so on, separated by single null values.

By separating symbols of the signals with null values, the UE 120 may maintain low-PAPR characteristics of the signals as single-carrier waveforms. For example, different single-carrier waveforms may be mapped to subsets of frequency resources (e.g., REs) through FDM. However, the addition of single-carrier waveforms through FDM may result in uplink transmissions having a larger PAPR (e.g., as compared to single-carrier waveforms). The UE 120 may reduce the PAPR of the multiplexed waveforms by performing TDM within a symbol period across the single-carrier signals in addition to FDM, and sets of time intervals of the symbol period that are not used by a waveform for one signal (e.g., signal A) may be used by a waveform for another signal (e.g., signal B). These techniques may help to ensure that signals included in an uplink transmission of the set of symbols may maintain properties similar to single-carrier waveforms and accordingly maintain a low PAPR.

As shown by reference number 610, the UE 120 may multiplex signals A and B after performing DFT spreading of signals A and B. For example, the DFT spreading may transform symbols of signal A and signal B to respective frequency domain signals, which are, in turn, mapped to multiple subcarriers. The UE 120 may transform the mapped signals using an inverse DFT (IDFT) to obtain a time domain waveform that may be transmitted to the BS 110. In this way, the UE 120 may perform time and frequency interleaving of signals A and B, while maintaining the low-PAPR characteristics of transmitting signal A and signal B as respective single carrier FDM signals.

As shown by reference number 612, the UE 120 may transmit signal A and signal B on antenna 1. For example, due to the null values included in signals A and B, signals A and B may occupy alternating time slots for transmission by antenna 1. This, in turn, may prevent or mitigate constructive or destructive interference between signals A and B, which preserves the low-PAPR characteristics of the individual signals.

As shown by reference number 614, the UE 120 may transmit modified versions of signal A and signal B on antenna 2. Here, the UE 120 transmits a complex conjugate of signal B on first alternating slots, and transmits a negative complex conjugate of signal A on second alternating slots. In other words, the UE 120 may use Alamouti encoding and/or space-time block coding to generate signal A, signal B, and the modified versions of signal A and signal B. By transmitting the modified versions of signals A and B using the second antenna, the UE 120 enables Alamouti processing of the four signals (e.g., signal A, signal B, the modified version of signal A, and the modified version of signal B) by the BS 110, as shown by reference number 616. For example, the BS 110 may process the four signals according to a space-time block code, which improves uplink performance of the UE 120 and reduces signal loss due to interference and other negative effects.

In some aspects, example 600 may be generalized to three or more transmit antennas. For example, the space-time block coding approach may be used to multiplex M streams onto N antennas. In such a case, the streams may be precoded to add null values as appropriate to enable multiplexing onto the N antennas, while preserving the low-PAPR characteristics described above.

In some aspects, the set of symbols may include a reference symbol, such as a DMRS and/or the like. In such a case, the UE 120 may multiplex streams generated according to the set of symbols. The UE 120 may configure the streams to maintain orthogonality across the two or more transmit antennas to enable separate channel estimation from each transmit antenna. Additionally, or alternatively, the reference signal may be transmitted on a separate OFDM symbol that is orthogonalized across the two or more transmit antennas using time, frequency, and/or code division multiplexing.

As indicated above, FIG. 6 is provided as an example. Other examples are possible and may differ from what was described with respect to FIG. 6.

Figure 7:
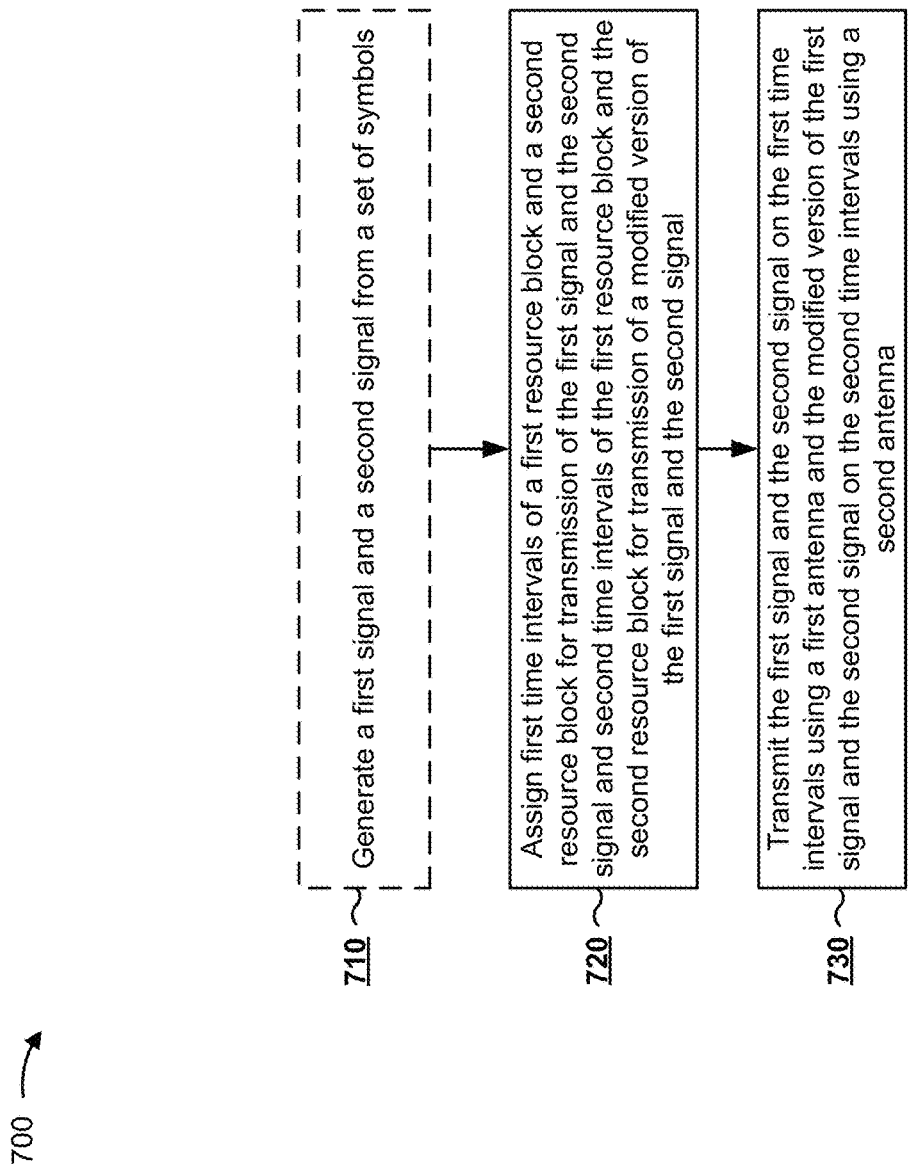
FIG. 7 is a diagram illustrating an example process performed, for example, by a wireless communication device, in accordance with various aspects of the present disclosure.

FIG. 7 is a diagram illustrating an example process 700 performed, for example, by a wireless communication device, in accordance with various aspects of the present disclosure. Example process 700 is an example where a wireless communication device (e.g., UE 120) transmits a set of symbols with transmit diversity while maintaining low peak to average power ratio.

At 710, the wireless communication device generates a first signal and a second signal from a set of symbols. For example, a first signal and a second signal may be generated based at least in part on a set of symbols. The first signal may include a first portion of the set of symbols, and may be interleaved with null values. Furthermore, the second signal may include a second portion of the set of symbols, and may be interleaved with null values. The null values (e.g., in combination with the Alamouti encoding used to generate a modified version of the first signal and the second signal) may enable transmission of the set of symbols while maintaining PAPR of the set of symbols. In some aspects, the first signal and the second signal may be generated before a discrete Fourier transform spreading process is performed with regard to the first signal and the second signal, which also maintains PAPR of the set of symbols.

At 720, the wireless communication device assigns first time intervals of a first resource block and a second resource block for transmission of the first signal and the second signal and second time intervals of the first resource block and the second resource block for transmission of a modified version of the first signal and the second signal. The first time intervals and the second time intervals may correspond to resource elements, subframes, slots, and/or the like. In some aspects, the first time intervals and the second time intervals may be interleaved in a time domain. Additionally, or alternatively, the first time intervals and the second time intervals may be orthogonal in the time domain. In some aspects, the first resource block and the second resource block may be contiguous with respect to each other. Additionally, or alternatively, the first time intervals and the second time intervals may be equally spaced in time. In some aspects, the first resource block and the second resource block may not be contiguous with respect to each other.

A first antenna of the wireless communication device may be assigned to transmit the first signal and the second signal during the first time intervals. For example, the first antenna may transmit a bitstream representing an interleaving of the first signal and the second signal. A second antenna of the wireless communication device may be assigned to transmit a modified version of the second signal during the second time intervals. The modified version may be generated using Alamouti encoding, as described in connection with FIG. 6, above. By assigning the different time intervals of the first and second resource blocks, frequency diversity is improved. Furthermore, by generating the first signal, the second signal, and the modified version of the first signal and the second signal using Alamouti encoding and including the null values, single-carrier properties of the transmissions of the first antenna and the second antenna is preserved.

At 730, the wireless communication device transmits the first signal and the second signal on the first time intervals using a first antenna and the modified version of the first signal and the second signal on the second time intervals using a second antenna. In this way, the wireless communication device achieves frequency diversity on the first antenna and the second antenna, and may preserve a low-PAPR characteristic of a single-carrier transmission of the set of symbols, as described in more detail elsewhere herein.

In some aspects, a first signal and a second signal may be generated based at least in part on the set of symbols. The first time intervals may be for transmission of the first signal and the second signal, and the second time intervals may be for transmission of a modified version of the first signal and a modified version of the second signal. In some aspects, the modified version of the first signal and the modified version of the second signal may be configured based at least in part on a space-time block code to enable combination of the first signal, the second signal, the modified version of the first signal, and the modified version of the second signal to obtain the set of symbols.

In some aspects, at least one symbol, of the set of symbols, may be associated with a reference signal. In some aspects, a set of signals, which includes the first signal and the second signal, may be generated based at least in part on a space-time block code to be transmitted on a group of antennas that includes the first antenna and the second antenna. The set of signals may be configured to permit time and frequency multiplexing of the set of signals. The set of signals may be transmitted on the group of antennas. In some aspects, subcarriers associated with the first signal may be orthogonal to subcarriers associated with the second signal.

Although FIG. 7 shows example blocks of process 700, in some aspects, process 700 may include additional blocks, fewer blocks, different blocks, or differently arranged blocks than those depicted in FIG. 7. Additionally, or alternatively, two or more of the blocks of process 700 may be performed in parallel.

Figure 8:
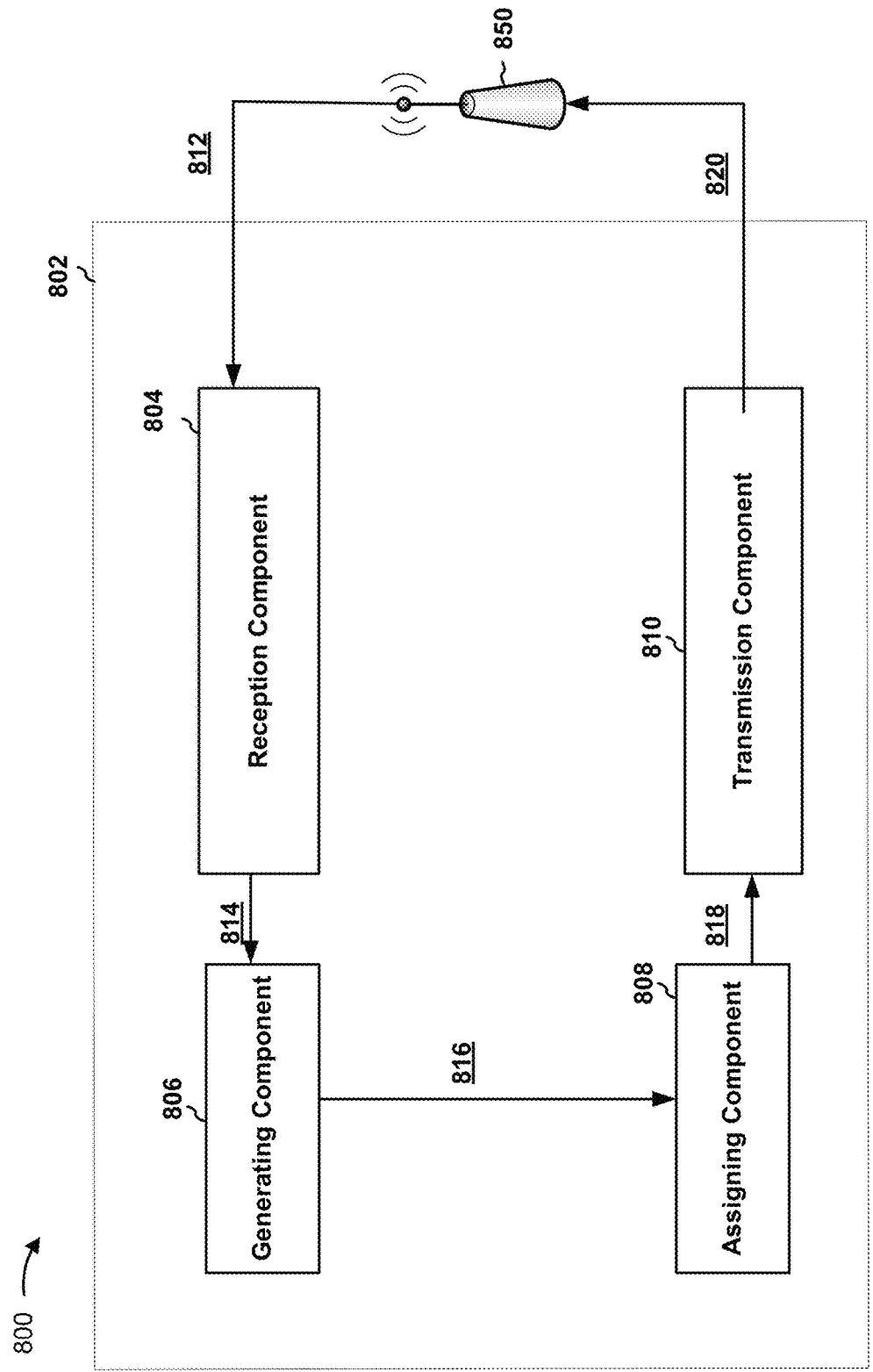
FIG. 8 is a conceptual data flow diagram illustrating the data flow between different modules/means/components in an example apparatus.

FIG. 8 is a conceptual data flow diagram 800 illustrating the data flow between different components/means/components in an example apparatus 802. The apparatus may be a UE 120. The apparatus includes a reception component 804, a generating component 806, an assigning component 808, and a transmission component 810.

The reception component 804 may receive data 812 from base station 850 (e.g., BS 110) or another device or source. The data 812 may include a bit stream or a set of symbols to be transmitted. The reception component may provide the data 812, as data 814, to the generating component 806. The generating component 806 may generate a first signal and a second signal from the data 814. For example, the generating component 806 may determine portions of symbols of the set of symbols for the first signal and the second signal, may add null values to the portions of symbols, and may generate or provide data 816 to the assigning component 808 including the first signal and the second signal based at least in part on Alamouti encoding.

The assigning component 808 may assign resource elements and/or RBs on which the set of symbols are to be transmitted, as described in more detail elsewhere herein. In some aspects, the assigning component 808 may perform various preprocessing and/or processing operations on the data 816, as also described in more detail herein. The assigning component 808 may provide data 818 to the transmission component 810. The data 818 may include symbols to be transmitted on particular time intervals. The transmission component 810 may transmit the symbols on the particular time intervals as signals 820.

The apparatus may include additional components that perform each of the blocks of the algorithm in the aforementioned flow chart of FIG. 7. As such, each block in the aforementioned flow chart of FIG. 7 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

Figure 9:
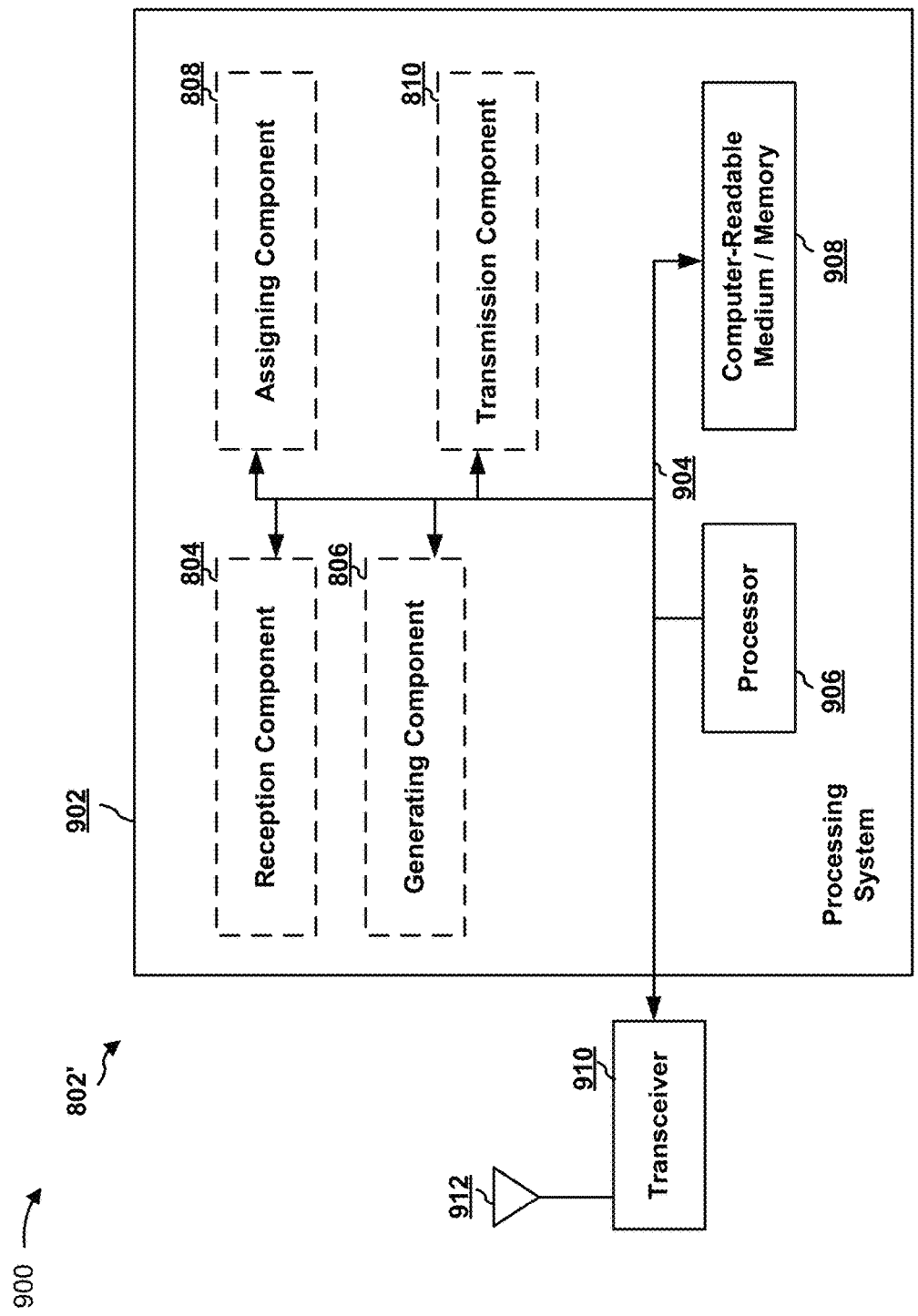
FIG. 9 is a diagram illustrating an example of a hardware implementation for an apparatus employing a processing system.

FIG. 9 is a diagram 900 illustrating an example of a hardware implementation for an apparatus 802' employing a processing system 902. The processing system 902 may be implemented with a bus architecture, represented generally by the bus 904. The bus 904 may include any number of interconnecting buses and bridges depending on the specific application of the processing system 902 and the overall design constraints. The bus 904 links together various circuits including one or more processors and/or hardware components, represented by the processor 906, the components 804, 806, 808, 810, and the computer-readable medium/memory 908. The bus 904 may also link various other circuits such as timing sources, peripherals, voltage regulators, and power management circuits, which are well known in the art, and therefore, will not be described any further.

The processing system 902 may be coupled to a transceiver 910. The transceiver 910 is coupled to one or more antennas 912. The transceiver 910 provides a means for communicating with various other apparatus over a transmission medium. The transceiver 910 receives a signal from the one or more antennas 912, extracts information from the received signal, and provides the extracted information to the processing system 902, specifically the reception component 804. In addition, the transceiver 910 receives information from the processing system 902, specifically the transmission component 810, and based on the received information, generates a signal to be applied to the one or more antennas 912. The processing system 902 includes a processor 906 coupled to a computer-readable medium/memory 908. The processor 906 is responsible for general processing, including the execution of software stored on the computer-readable medium/memory 908. The software, when executed by the processor 906, causes the processing system 902 to perform the various functions described supra for any particular apparatus. The computer-readable medium/memory 908 may also be used for storing data that is manipulated by the processor 906 when executing software. The processing system further includes at least one of the components 804, 806, 808, and 810. The components may be software components running in the processor 906, resident/stored in the computer readable medium/memory 908, one or more hardware components coupled to the processor 906, or some combination thereof. The processing system 902 may be a component of the UE 120 and may include the memory 282 and/or at least one of the TX processor 264, the RX processor 258, and the controller/processor 280.

In one configuration, the apparatus 802/802' for wireless communication includes means for generating a first signal and a second signal from a set of symbols; means for assigning a first resource block and a second resource block for transmission of the first signal and the second signal; and means for transmitting the first signal and the second signal on the first time intervals using the first antenna and a modified version of the first signal and the second signal on the second time intervals using the second antenna. The aforementioned means may be one or more of the aforementioned components of the apparatus 802 and/or the processing system 902 of the apparatus 802' configured to perform the functions recited by the aforementioned means. As described supra, the processing system 902 may include the TX processor 264, the RX processor 258, and the controller/processor 280. As such, in one configuration, the aforementioned means may be the TX processor 264, the RX processor 258, and the controller/processor 280 configured to perform the functions recited by the aforementioned means.

It is understood that the specific order or hierarchy of blocks in the processes/flow charts disclosed is an illustration of exemplary approaches. Based upon design preferences, it is understood that the specific order or hierarchy of blocks in the processes/flow charts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "at least one of A, B, and C," and "A, B, C, or any combination thereof" include any combination of A, B, and/or C, and may include multiples of A, multiples of B, or multiples of C. Specifically, combinations such as "at least one of A, B, or C," "at least one of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed as a means plus function unless the element is expressly recited using the phrase "means for."

What is claimed is:

1. A method of wireless communication, comprising:
   generating, by a wireless communication device having a first antenna and a second antenna, a first signal and a second signal from a set of symbols, wherein the first signal includes a first portion of the set of symbols interleaved with null values and the second signal includes a second portion of the set of symbols interleaved with null values;

assigning, by the wireless communication device, a first resource block and a second resource block for transmission of the first signal and the second signal, wherein the first antenna is assigned to transmit the first signal and the second signal during first time intervals of the first resource block and the second resource block, wherein the second antenna is assigned to transmit a modified version of the first signal and the second signal during second time intervals of the first resource block and the second resource block, and wherein the first time intervals and the second time intervals are different time intervals; and transmitting, by the wireless communication device, the first signal and the second signal on the first time intervals using the first antenna and the modified version of the first signal and the second signal on the second time intervals using the second antenna, wherein the first signal and the second signal are interleaved with each other, and wherein the modified version of the first signal and the second signal is generated based at least in part on Alamouti encoding of the set of symbols.

2. The method of claim 1, wherein the first time intervals and the second time intervals are interleaved in a time domain.

3. The method of claim 1, wherein the first time intervals and the second time intervals are orthogonal in a time domain.

4. The method of claim 1, wherein the first resource block and the second resource block are contiguous with respect to each other.

5. The method of claim 1, wherein the first time intervals and the second time intervals are equally spaced in time.

6. The method of claim 1, wherein the first resource block and the second resource block are not contiguous with respect to each other.

7. The method of claim 1, wherein the first signal and the second signal are generated before a discrete Fourier transform spreading process is performed with regard to the first signal and the second signal.

8. The method of claim 1, wherein at least one symbol, of the set of symbols, is associated with a reference signal.

9. The method of claim 1,
wherein a set of signals, which includes the first signal and the second signal, is generated based at least in part on a space-time block code to be transmitted on a group of antennas that includes the first antenna and the second antenna,
wherein the set of signals is configured to permit time and frequency multiplexing of the set of signals, and
wherein the set of signals are to be transmitted on the group of antennas.

10. The method of claim 1, wherein subcarriers associated with the first signal are orthogonal to subcarriers associated with the second signal.

11. A wireless communication device, comprising:
memory; and
one or more processors coupled to the memory, the memory and the one or more processors configured to:
generate a first signal and a second signal from a set of symbols, wherein the first signal includes a first portion of the set of symbols interleaved with null values, and wherein the second signal includes a second portion of the set of symbols interleaved with null values;

assign a first resource block and a second resource block for transmission of the first signal and the second signal, wherein a first antenna of the wireless communication device is assigned to transmit the first signal and the second signal during first time intervals of the first resource block and the second resource block, wherein a second antenna of the wireless communication device is assigned to transmit a modified version of the first signal and the second signal during second time intervals of the first resource block and the second resource block, and wherein the first time intervals and the second time intervals are different time intervals; and transmit the first signal and the second signal on the first time intervals using the first antenna and the modified version of the first signal and the second signal on the second time intervals using the second antenna, wherein the first signal and the second signal are interleaved with each other, and wherein the modified version of the first signal and the second signal is generated based at least in part on Alamouti encoding of the set of symbols.

12. The wireless communication device of claim 11, wherein the first signal and the second signal are generated before a discrete Fourier transform spreading process is performed with regard to the first signal and the second signal.

13. The wireless communication device of claim 11, wherein at least one symbol, of the set of symbols, is associated with a reference signal.

14. The wireless communication device of claim 11, wherein a set of signals, which includes the first signal and the second signal, is generated based at least in part on a space-time block code to be transmitted on a group of antennas that includes the first antenna and the second antenna, and wherein the set of signals is configured to permit time and frequency multiplexing of the set of signals, and wherein the set of signals are to be transmitted on the group of antennas.

15. The wireless communication device of claim 11, wherein subcarriers associated with the first signal are orthogonal to subcarriers associated with the second signal.

16. An apparatus for wireless communication, comprising:
means for generating a first signal and a second signal from a set of symbols, wherein the first signal includes a first portion of the set of symbols interleaved with null values and the second signal includes a second portion of the set of symbols interleaved with null values;
means for assigning a first resource block and a second resource block for transmission of the first signal and the second signal, wherein a first antenna of the apparatus is assigned to transmit the first signal and the second signal during first time intervals of the first resource block and the second resource block, wherein a second antenna of the apparatus is assigned to transmit a modified version of the first signal and the second signal during second time intervals of the first resource block and the second resource block, and wherein the first time intervals and the second time intervals are different time intervals; and
means for transmitting the first signal and the second signal on the first time intervals using the first antenna and the modified version of the first signal and the second signal on the second time intervals using the second antenna, wherein the first signal and the second signal are interleaved with each other, and wherein the modified version of the first signal and the second signal is generated based at least in part on Alamouti encoding of the set of symbols.

17. The apparatus of claim 16, wherein the first signal and the second signal are generated before a discrete Fourier transform spreading process is performed with regard to the first signal and the second signal.

18. The apparatus of claim 16, wherein at least one symbol, of the set of symbols, is associated with a reference signal.

19. The apparatus of claim 16, wherein a set of signals, which includes the first signal and the second signal, is generated based at least in part on a space-time block code to be transmitted on a group of antennas that includes the first antenna and the second antenna, and wherein the set of signals is configured to permit time and frequency multiplexing of the set of signals, and wherein the set of signals are to be transmitted on the group of antennas.

20. The apparatus of claim 16, wherein subcarriers associated with the first signal are orthogonal to subcarriers associated with the second signal.

21. A method of wireless communication, comprising:
assigning, by a wireless communication device having a first antenna and a second antenna, a first resource block and a second resource block for transmission of a set of symbols, wherein the first antenna is assigned to transmit a first portion of the set of symbols during first time intervals of the first resource block and the second resource block, wherein the second antenna is assigned to transmit a second portion of the set of symbols during second time intervals of the first resource block and the second resource block, and wherein the first time intervals and the second time intervals are different time intervals; and
transmitting, by the wireless communication device, the first portion of the set of symbols on the first time intervals using the first antenna and the second portion of the set of symbols on the second time intervals using the second antenna, wherein the first portion of the set of symbols on the first time intervals and the second portion of the set of symbols are interleaved with each other.

22. The method of claim 21, wherein the first time intervals and the second time intervals are interleaved in a time domain.

23. The method of claim 21, wherein the first time intervals and the second time intervals are orthogonal in a time domain.

24. The method of claim 21, wherein the first resource block and the second resource block are contiguous with respect to each other.

25. The method of claim 21, wherein the first time intervals and the second time intervals are equally spaced in time.

26. The method of claim 21, wherein the first resource block and the second resource block are not contiguous with respect to each other.

27. The method of claim 21,
wherein a first signal and a second signal are to be generated based at least in part on the set of symbols,
wherein the first time intervals are for transmission of the first signal and the second signal, and
wherein the second time intervals are for transmission of a modified version of the first signal and a modified version of the second signal.

28. The method of claim 27, wherein the modified version of the first signal and the modified version of the second signal are configured based at least in part on a space-time block code to enable combination of the first signal, the second signal, the modified version of the first signal, and the modified version of the second signal to obtain the set of symbols.

29. The method of claim 27, wherein the first signal and the second signal are generated before a discrete Fourier transform spreading process is performed with regard to the first signal and the second signal.

30. The method of claim 21, wherein at least one symbol, of the set of symbols, is associated with a reference signal.

* * * * *